(12) United States Patent  (10) Patent No.: US 6,890,183 B2
Baker  (45) Date of Patent: May 10, 2005

(54) COLLAPSIBLE EDUCATIONAL CHART

(75) Inventor: Jeff Baker, Cicero, IN (US)

(73) Assignee: Noble Logos, Cicero, IN (US)

( * ) Notice: Subject to any disclaimer, the term of this patent is extended or adjusted under 35 U.S.C. 154(b) by 0 days.

(21) Appl. No.: 10/329,301

(22) Filed: Dec. 24, 2002

(65) Prior Publication Data

US 2004/0121296 A1 Jun. 24, 2004

(51) Int. Cl.[7] .......................... G09B 29/00; G09F 1/00; G09F 1/06
(52) U.S. Cl. .................. 434/430; 434/262; 434/365; 40/124.13; 40/124.04; 40/904; 283/56
(58) Field of Search .................. 283/56; 434/430, 434/262–275, 365; 40/904, 124.13, 124.04; 281/31; 150/147; 229/72

(56) References Cited

U.S. PATENT DOCUMENTS

| | | | | |
|---|---|---|---|---|
| 757,549 A | * | 4/1904 | Gould | 206/81 |
| 811,658 A | * | 2/1906 | O'Connor | 40/530 |
| 1,802,553 A | * | 4/1931 | Dyment | 40/124.13 |
| 2,871,596 A | * | 2/1959 | Weiss | 40/216 |
| 3,517,449 A | * | 6/1970 | Frandsen et al. | 434/368 |
| 3,968,573 A | * | 7/1976 | Poliniere | 434/153 |
| 4,182,063 A | * | 1/1980 | Klosel | 40/610 |
| 4,261,283 A | * | 4/1981 | Taylor | 116/209 |
| 4,681,253 A | * | 7/1987 | Engelhardt | 229/92.8 |
| 5,029,902 A | * | 7/1991 | Komori | 283/56 |
| 5,174,674 A | * | 12/1992 | Norwood | 402/73 |
| 5,487,566 A | * | 1/1996 | Hedge, Jr. | 283/56 |
| 5,975,390 A | | 11/1999 | Saroli | |
| 6,123,361 A | | 9/2000 | Cohen | |
| 6,158,157 A | | 12/2000 | Hiscock et al. | |
| 6,438,877 B1 | * | 8/2002 | Ruiz | 40/124.04 |

* cited by examiner

Primary Examiner—Derris H. Banks
Assistant Examiner—Dmitry Suhol
(74) Attorney, Agent, or Firm—Timothy H. Van Dyke; Beusse Brownlee Wolter Mora & Maire

(57) ABSTRACT

Disclosed herein is a collapsible, educational chart that also serves as a promotional item.

4 Claims, 3 Drawing Sheets

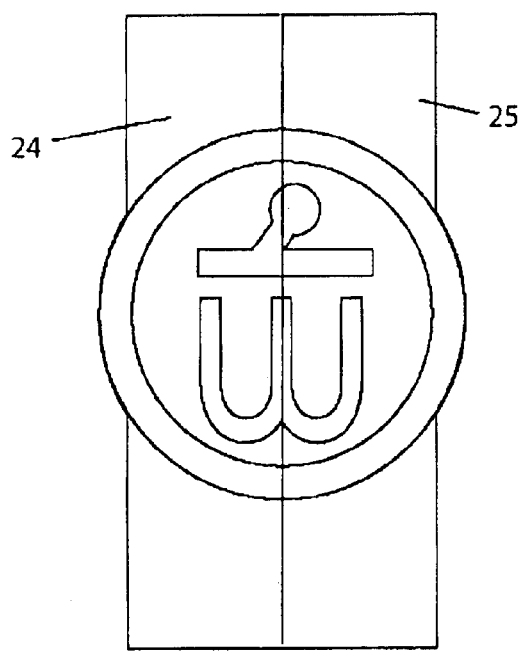
Figure 2A
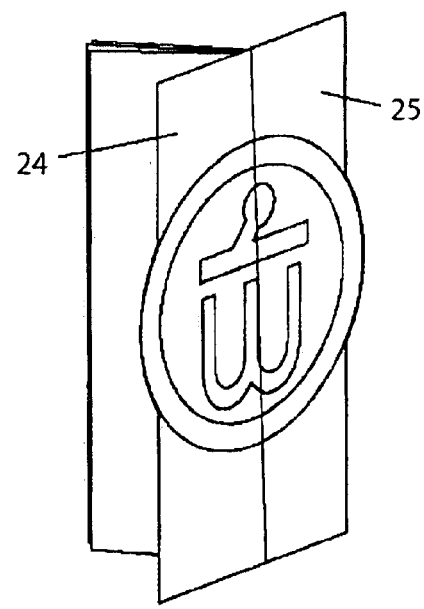
Figure 2B
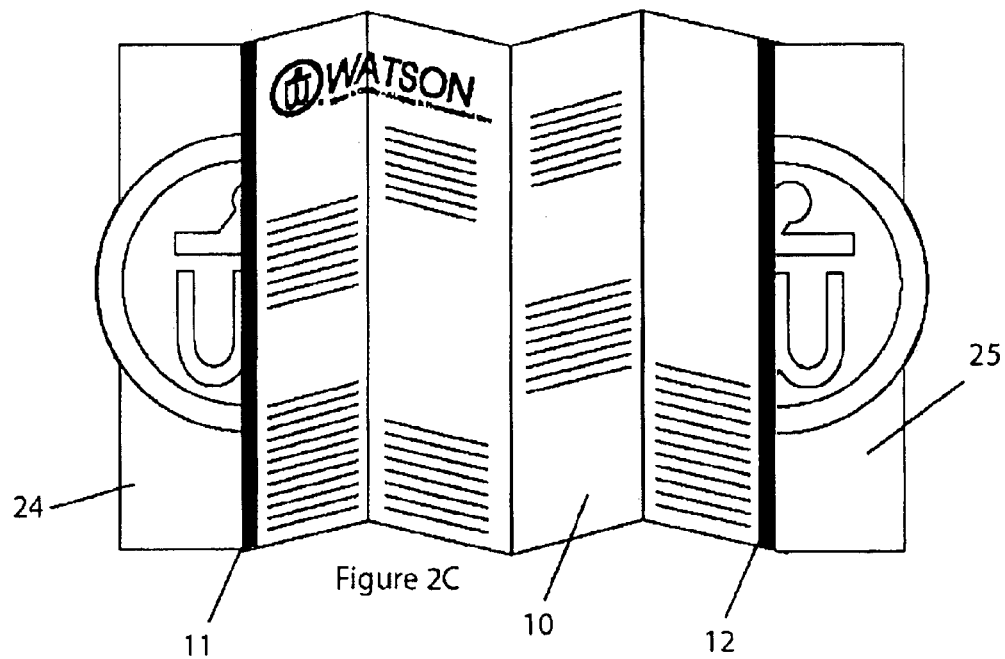
Figure 2C
Figure 2

COLLAPSIBLE EDUCATIONAL CHART

FIELD OF THE INVENTION

This invention relates generally to collapsible, educational chart designed for both promotional and educational purposes.

BACKGROUND OF THE INVENTION

Marketing products to a consumer and gaining repeat business has become more difficult as an increasing number of companies sacrifice innovation for financial stability by offering competing products having substantially similar features and specifications. Products designed to match the best product in a class often sell, but these products fail to encourage customer loyalty and repeat business because customers fail to distinguish one product from another. Today, differentiating a product, innovating, and engaging the customer on an emotional level are the keys to a successful marketing plan (Ealey, L. and L. Troyano-Bermudez, The McKinsey Quarterly, 1996 (4):62–75). Traditional "face-to-face, or "one-on-one" selling time with a buyer continues to decline in both quantity and quality. Without some constant reminder, and more particularly a reminder that draws attention to itself, the client may fail to recommend the product, or select it over a similar competing product when re-ordering.

In an effort to increase product awareness, businesses often use promotional items. The art of making and using promotional items is well established. It is a subset of general advertising and marketing in which a physical object, at times a sample of the actual product, rather than paper print advertising, is provided to a customer or a potential customer. These items typically include calendars, pens, magnets, caps, key chains and the like. However, items traditionally used are usually simple products that are only capable of marketing a product in a discreet manner. These gifts often provide little motivation for continued use by a client, thereby minimize their effectiveness as a marketing tool.

It is axiomatic that in the field of advertisement/marketing, perception is often reality. Thus, a novel promotional item may make an immediate, and indelible positive first impression, whereas the presentation of an ordinary, nondescript promotional item may actually foreclose future business opportunities. When a salesperson hands out something unique tied to a particular product, the product makes a biggest impact on the client. The most unique, practical and appealing promotional products will be the ones remembered and the ones most likely to increase customer goodwill, referral & repeat business. A client will likely be interested in receiving an eye-catching promotional item, particularly if it has a secondary function that enables its continued use. The most successful promotional products will be capable of establishing brand recognition by reinforcing a visual message, even when the consumer is not engaged in an activity normally associated with the products use. For example, a client may be inclined to display a unique promotional item having a separate utility on his or her desk for use. Through repeat use of the item, the client will be reminded of the underlying product, thereby increasing the likelihood of repeat business or referrals. The more original the promotional item, the more likely it will be remembered.

Some promotional articles have a secondary function in addition to the primary marketing function. For instance, U.S. Pat. No. 5,975,390 (D. Saroli, Nov. 2, 1999) discloses a removable golf cart cushion that has a space for advertising and that also provides protection from a golf cart side rail, and also provides a holder function for golf accessories.

Some promotional items emulate the actual product being marketed. For instance, U.S. Pat. No. 6,123,361 (M. L. Cohen, Sep. 26, 2000) discloses promotional mailing which includes inserts in an envelope, where the inserts have a promotional message and a simulated reward item. The simulated reward item simulates the actual item being promoted, and is at least partially displayed through a window in the envelope. This is said to provide an incentive to open the envelope. U.S. Pat. No. 6,158,157 (Hiscock and David, Dec. 12, 2000) discloses a promotional item in the shape of a suspended, enlarged replica of a beer bottle cap for use in bars and restaurants. The article houses a magnet which attracts bottle caps. The article has the dual utility of both marketing a product, and providing a place to temporarily store discarded bottle caps. Ideally, the interaction with the product will entice a consumer to purchase the brand name drink advertised on the article.

Some products are marketed in channels in which certain intermediate distributors are key to sales, for example physicians who have the authority to prescribe one pharmaceutical product over another having a similar effect. Here, lest the physician tire of the promotional item and dispose of it, a challenge exists to provide an interesting promotional item that will communicate the message of the product, and also provide secondary utility in the form of decoration, amusement, and/or a specific physical function.

Notwithstanding the aforementioned items, a need remains for promotional items that have both a marketing function and an educational function, and that are well suited for intermediate distributors such as physicians. Physicians are more likely to utilize promotional items, and in turn develop goodwill toward such items, if such items serve as a teaching aid to his/her patients.

SUMMARY OF THE INVENTION

The present invention provides a collapsible educational chart that also functions as a promotional item. The item is preferably designed to be quickly noticed by everyone within view and provides an excellent advertising medium for any manufacturer or business. In use a marketing program targets a product such as, for example, prescription drugs that is developed by a company. The promotional item preferably provides educational information about the drug and/or or body systems that the drug is designed to treat, and/or educational information about the disease or medical condition the drug is designed to treat. A major advantage of having such secondary utility is that it increases the likelihood that the article will remain in use for a longer period of time and thereby have a longer lasting marketing effect.

In one embodiment the subject invention pertains to a collapsible chart, wherein said chart comprises a middle portion and two end portions. The middle portion comprises a plurality of folds and is preferably configured such that the chart collapses down into a "booklet-type" form. The booklet type form refers to a design where the two end portions of the chart are brought in proximity or contact with each other. According to a preferred embodiment, magnets are disposed on the said two ends whereby, when the chart is collapsed, the magnets come together such that they aid in maintaining the chart in a closed or collapsed state. Those skilled in the art will appreciate that magnets may be substituted with other fasteners known to be detachable, including, but not limited to, hook and loop material (e.g. VELCRO®), clamps, clips, snaps, or adhesives. Extending from the two end portions is a flap which contains the advertising or promotional information. Preferably, the information is cut into two sections such that, when the two end portions are brought together, the flaps create the completed advertising or promotional information.

BRIEF DESCRIPTION OF THE DRAWINGS

FIG. 1A shows a front view of the collapsed embodiment. FIG. 1B shows a perspective view of the collapsed embodiment. FIG. 1C shows a front view of the embodiment in an open state.

FIGS. 2A-C shows an embodiment of the subject invention comprising flaps that form an example of a company logo. FIG. 2A shows a front view of the collapsed embodiment. FIG. 2B shows a perspective view of the collapsed embodiment. FIG. 2C shows a front view of the embodiment in an open state.

FIG. 3A shows a front view of the collapsed embodiment. FIG. 3B shows a perspective view of the collapsed embodiment. FIG. 3C shows a front view of the embodiment in an open state.

DETAILED DESCRIPTION OF THE INVENTION

Advertisement materials are routinely handed out or sold by manufacturers or businesses as a practical type of promotional material. It is apparent that the more striking or obvious the advertising material is, the more it will be noticed by the public and will thus lead to better advertising. Also, as function is provided with the item, the likelihood that a product will be used increases. The novelty attached to the present invention presents a noteworthy item that catches the attention of the client, or visitors, while simultaneously increasing the marketing potential for the product.

Figure 1:
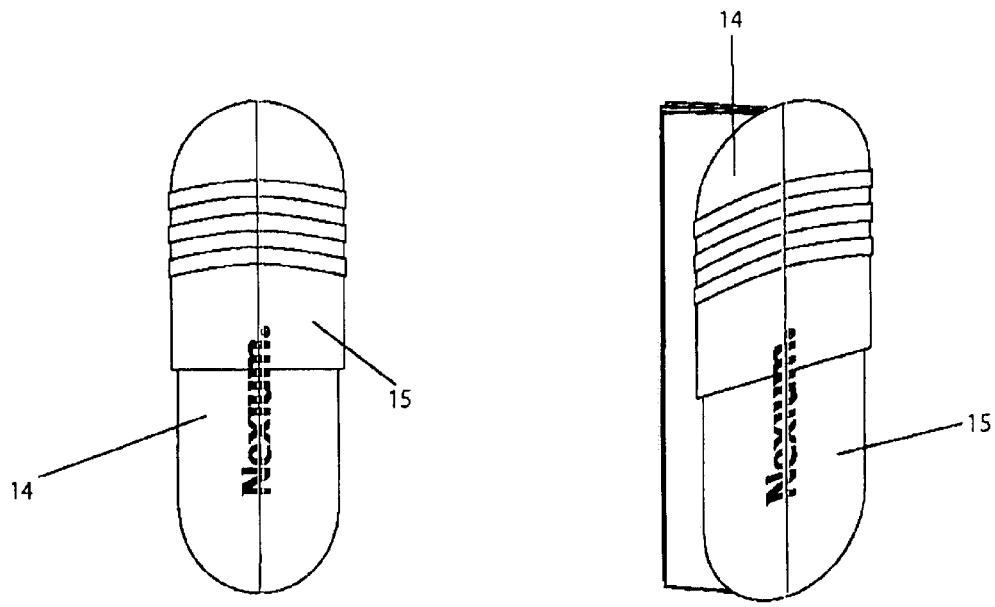
FIGS. 1A-C shows an embodiment of the subject invention comprising flaps that form the shape of capsule when brought together.
Figure 1:
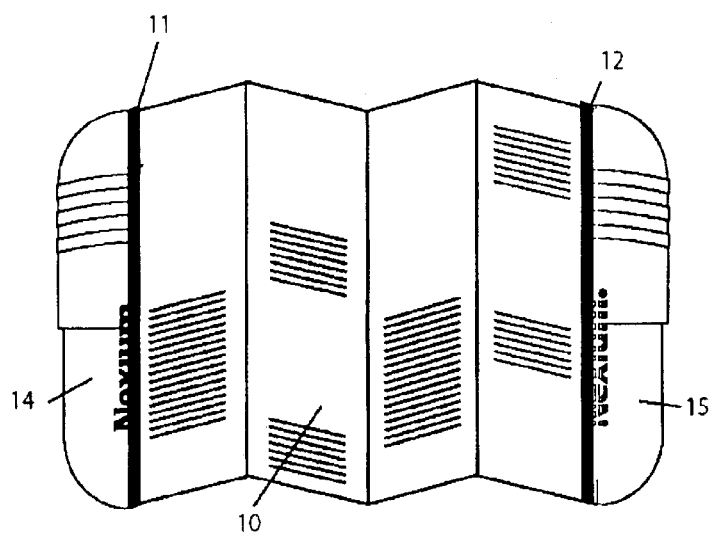
Figure 3:
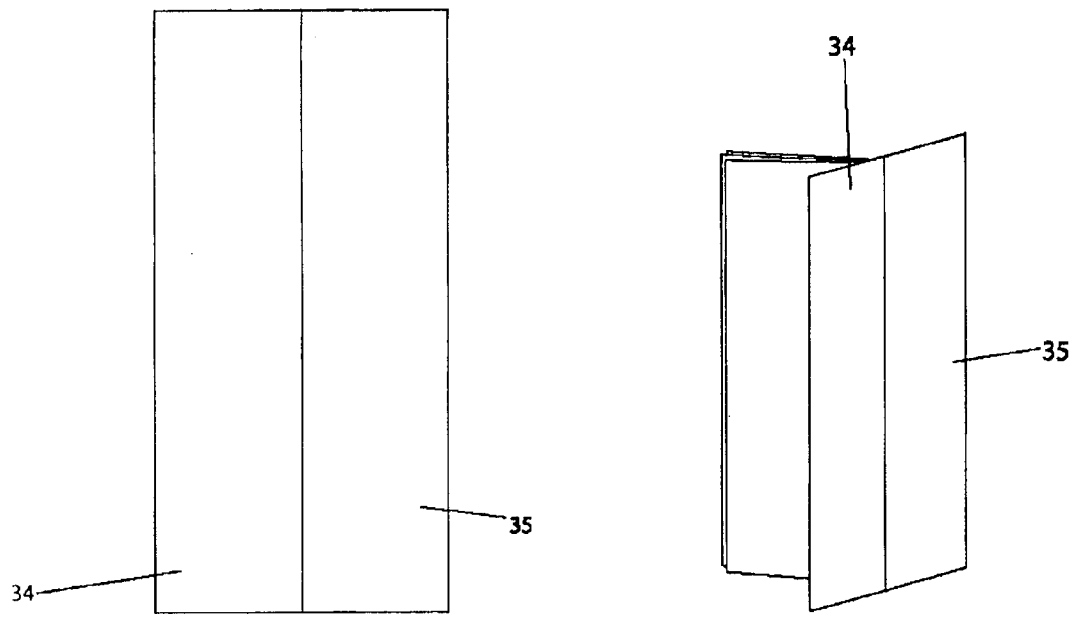
FIGS. 3A-C shows an embodiment of the subject invention comprising flaps that form an arbitrary advertisement.
Figure 3:
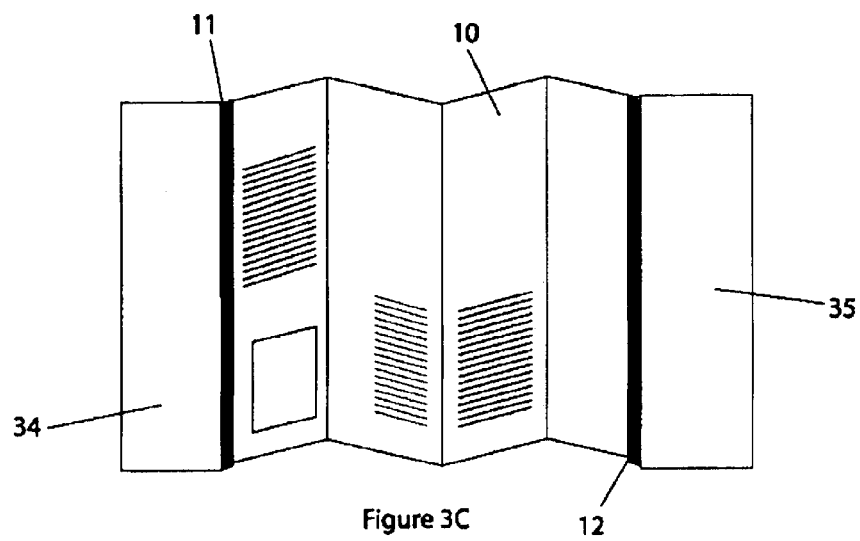

FIGS. 1–3 show different embodiments of collapsible educational charts according to the teachings herein. In these embodiments, opposing magnets are disposed on the first end 11 and second end 12 of the body portion 10. When the collapsible chart 1, 2, or 3 is collapsed, the first end and second end are brought together such that the flaps (shown as 14 and 15 in FIG. 1; 24 and 25 in FIG. 2; and 34 and 35 in FIG. 3) create a structure that displays promotional, advertising or other types of information for prominent display.

In a preferred example, the name of the product being marketed may be overtly located on the flaps to reinforce name recognition each time the object is viewed. In those cases where the function of the product can be determined by the product name, it may be advantageous to create a flap structure that has no connection with the function of the device. In most cases however, the name of the product will not suggest its use. In those situations where the function of the product is unclear from the name, it may be advantageous to construct a product that indicates its use upon view. In any embodiment, a useful secondary function which encourages continued use is incorporated into the subject invention. This invention is well suited for mass-production and scale-up techniques to reduce marketing costs while ensuring maximum exposure of product.

In view of the foregoing, one can recognize that the present invention provides a unique marketing tool for advertising a product and which possesses educational or other informative value. It is noted that the figures depicting this invention are merely representative of particular embodiments and are not meant to limit the range of possible configurations. Those skilled in the art will appreciate that the scope of this invention should be measured by the claims appended hereto, and not merely by the specific embodiments exemplified herein.

What is claimed is:

1. A collapsible, educational chart comprising a body portion, said body portion comprising a first end and a second end, wherein said body portion comprises at least one crease to facilitate folding of said body portion, and wherein said body portion comprises educational information displayed thereon;

at least one fastener disposed on both first and second ends, wherein said body portion and said first and second ends are configured such that the chart collapses to bring together said first and second ends whereby said at least one fastener holds said chart in a collapsed state; and at least one first flap and at least one second flap each containing promotional information displayed thereon; wherein said first flap is integral with or attached to said first end and said second flap is integral with or attached to said second end, and wherein said first and second flap extend outwardly on a transverse axis relative to said first or second end, respectively, wherein said first flap and second flap provide a structure for displaying information, and wherein said promotional information is cut into at least two sections such that, when said first and second end are brought together, said at least one first flap and said at least one second flap create a completed display of said promotional information.

2. The collapsible, educational chart of claim 1, wherein said at least one fastener is selected from the group consisting of magnets, hook and loop material, clips, snaps, clamps or adhesives.

3. The collapsible, educational chart of claim 1, wherein said at least one fastener comprises at least one magnet disposed on said first end and at least one magnet disposed on said second end.

4. The collapsible, educational chart of claim 1, wherein said body portion comprises three to five creases.

* * * * *